US009135223B2

(12) United States Patent  
Capela et al.

(10) Patent No.: US 9,135,223 B2  
(45) Date of Patent: Sep. 15, 2015

(54) AUTOMATICALLY CONFIGURING WHITE SPACE AROUND AN OBJECT IN A DOCUMENT

(75) Inventors: Jay C. Capela, Santa Cruz, CA (US); Matthew T. Schomer, Santa Cruz, CA (US)

(73) Assignee: Apple Inc., Cupertino, CA (US)

(*) Notice: Subject to any disclaimer, the term of this patent is extended or adjusted under 35 U.S.C. 154(b) by 998 days.

(21) Appl. No.: 12/688,686

(22) Filed: Jan. 15, 2010

(65) Prior Publication Data

US 2011/0179351 A1  Jul. 21, 2011

(51) Int. Cl.
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |

(52) U.S. Cl.  
CPC ............ *G06F 17/211* (2013.01); *G06F 17/214* (2013.01)

(58) Field of Classification Search  
CPC .............................. G06F 17/211; G06F 17/24  
USPC .................. 715/245, 246, 200, 243, 209, 244  
See application file for complete search history.

(56) References Cited

U.S. PATENT DOCUMENTS

| 4,829,470 | A | * | 5/1989 | Wang ............................. 715/234 |
| 5,214,755 | A | * | 5/1993 | Mason .......................... 715/209 |
| 5,805,170 | A | | 9/1998 | Burch |
| 5,835,920 | A | * | 11/1998 | Horton ........................... 715/210 |
| 7,373,593 | B2 | | 5/2008 | Uchida |
| 7,516,402 | B2 | * | 4/2009 | Koivisto et al. ............... 715/238 |
| 7,623,711 | B2 | * | 11/2009 | Berkner ........................ 382/176 |
| 8,171,401 | B2 | | 5/2012 | Sun |
| 2003/0163785 | A1 | * | 8/2003 | Chao et al. ..................... 715/517 |
| 2004/0044964 | A1 | | 3/2004 | Martens et al. |
| 2005/0094206 | A1 | * | 5/2005 | Tonisson ....................... 358/1.18 |
| 2006/0195784 | A1 | * | 8/2006 | Koivisto et al. ............... 715/523 |
| 2007/0266309 | A1 | * | 11/2007 | Sellman ........................ 715/513 |
| 2009/0113293 | A1 | | 4/2009 | Schubert |
| 2009/0199123 | A1 | | 8/2009 | Albertson et al. |
| 2009/0254814 | A1 | * | 10/2009 | Lai et al. ........................ 715/244 |
| 2009/0327872 | A1 | | 12/2009 | Kamiyama et al. |
| 2010/0174985 | A1 | * | 7/2010 | Levy et al. ..................... 715/244 |
| 2010/0185949 | A1 | * | 7/2010 | Jaeger ............................ 715/730 |

* cited by examiner

*Primary Examiner* — Manglesh M Patel  
*Assistant Examiner* — Nicholas Hasty  
(74) *Attorney, Agent, or Firm* — Downey Brand LLP

(57) ABSTRACT

The described embodiments provide a word processor for formatting a document. During operation, the word processor places an object in a section of text in a document. When placing the object in the section of text, the word processor adds a specified amount of white space on a set of sides of the object. The word processor then places text from the section of text on at least a first side and a second side of the object. After placing the text, the word processor determines if the text on the first side of the object is located further from the object than the text on the second side of the object. If so, the word processor adjusts the white space on the first side of the object so that the text on the first side of the object is located closer to the object.

21 Claims, 6 Drawing Sheets

AUTOMATICALLY CONFIGURING WHITE SPACE AROUND AN OBJECT IN A DOCUMENT

RELATED APPLICATIONS

This application is related to U.S. patent application Ser. No. 12/688,622, titled "Automatically Wrapping Text in a Document," by inventors Jay C. Capela, Matthew T. Schomer and Christopher E. Rudolph, filing date 15 Jan. 2010. This application is also related to U.S. patent application Ser. No. 12/688,613, titled "Automatically Placing an Anchor for an Object in a Document," by inventors Jay C. Capela, Christopher E. Rudolph, and Matthew T. Schomer filing date 15 Jan. 2010.

BACKGROUND

1. Field

The described embodiments relate to techniques for formatting documents in a word processor. More specifically, the described embodiments relate to a technique for automatically configuring white space around an object in a document in a word processing application.

2. Related Art

Modern word processors include numerous features to assist with creating and editing documents. For example, virtually all word processors facilitate the placement and formatting of both text and non-textual objects such as tables, images, and charts in a document. In doing so, the word processors enable users to place objects in documents and to control the arrangement of text around the objects.

Most word processors include a setting that enables a user to configure the amount of white space that is maintained around objects in a document. This setting enables the user to control both the appearance of the objects and the space between the objects and surrounding text. For example, a word processor can enable a user to set a spacing of 12 pixels on each side of an object. In another example, the word processor can enable a user to set a different spacing value for each side of an object (e.g., 0.5 inch on the top and bottom of an object and 0.25 inch on the sides). The word processor then maintains at least the specified spacing between each side of an object and any nearby text.

In some cases, although the word processor maintains the configured amount of white space on each side of an object, the white space can appear to be larger on a given side of an object than the white space appears on the other side or sides of the object. For example, because fonts typically provide additional space for elements within some characters (e.g., for diacritical marks), when the word processor adds the configured white space between a character and an object, the additional space for the characters can cause the white space between the characters and the object to appear incorrect. Moreover, the word processor can displace text (e.g., shift the text down or to the side) based on the additional, space provided by a font, making the white space appear even larger. Thus, a user may have to manually adjust the white space settings for one or more sides of an object to ensure that the object displays with the desired amount of white space on each side of the object.

SUMMARY

The described embodiments provide a word processor for formatting a document. During operation, in response to a command from a user, the word processor places an object in a section of text in a document. When placing the object in the section of text, the word processor adds a specified amount of white space on a set of sides of the object. Next, the word processor places text from the section of text on at least a first side and a second side of the object. After placing the text, the word processor determines if the text on the first side of the object is located further from the object than the text on the second side of the object. If so, the word processor adjusts the white space on the first side of the object so that the text on the first side of the object is located closer to the object.

In some embodiments, when leaving the specified amount of white space on each side of the object, the word processor leaves: (1) a default amount of white space on each side of the object; or (2) a configured amount of white space on each side of the object, wherein the configured amount is set using one or more per-object white space values.

In some embodiments, when placing the text on at least the first side and the second side of the object, the word processor places text on each side of the object in accordance with at least one of: (1) a document-wide text-arrangement variable; or (2) a per-object text-arrangement variable.

In some embodiments, when determining if the text on the first side of the object is located further from the object than the text on the second side of the object, the word processor determines a first distance from the first side of the object to a nearest visible portion of the text on the first side of the object, and determines a second distance from the second side of the object to a nearest visible portion of the text on the second side of the object. The word processor then determines if the first distance is less than the second distance.

In some embodiments, when the first distance is less than the second distance by more than a threshold value, the word processor determines that the text on the first side of the object is located further from the object than the text on the second side of the object.

In some embodiments, when adjusting the white space on the first side of the object, the word processor reduces the amount of white space on the first side of the object. The word processor then repositions the text from the section of text on the first side of the object closer to the first side of the object in accordance with the reduced amount of white space.

In some embodiments, when reducing the amount of white space on the first side of the object, the word processor determines a difference between the first distance and the second distance and reduces the amount of white space in proportion to the difference.

In some embodiments, when reducing the amount of white space in proportion to the difference, the word processor subtracts a portion of the difference from the specified amount of white space for the first side of the object.

In some embodiments, when adjusting the white space on the first side of the object so that the text on the first side of the object is located closer to the object, the word processor moves the object further away from a nearest visible portion of the text on the second side of the object and closer to a nearest visible portion of the text on the first side of the object.

In some embodiments, the word processor is an application that is executed using a processing subsystem in a computer system.

BRIEF DESCRIPTION OF THE FIGURES

Throughout the figures and the description, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description can be stored on a computer-readable storage medium. The computer-readable storage medium can include any device or medium (or combination of devices and/or mediums) that can store data structures and code for use by a computer system. For example, the computer-readable storage medium can include volatile memory or non-volatile memory, including flash memory, random access memory (RAM, SRAM, DRAM, RDRAM, DDR/DDR2/DDR3 SDRAM, etc.), read-only memory (ROM), magnetic or optical storage devices (e.g., disk drives, magnetic tape, CDs, DVDs), or other mediums capable of storing data structures or code. In the described embodiments, the computer-readable storage medium can be included in memory subsystem 104 (see FIG. 1) or in another of the subsystems in computer system 100.

Some or all of the methods and processes described in the following description can be embodied as program code that is stored in a computer-readable storage medium. When a computer system (e.g., computer system 100) reads and executes the program code stored on the computer-readable storage medium, the computer system performs the methods and processes in the program code stored in the computer-readable storage medium.

Some or all of the methods and processes described in the following description can be included in hardware modules. For example, the hardware modules can include, but are not limited to, application-specific integrated circuit (ASIC) chips, field-programmable gate arrays (FPGAs), and other programmable-logic devices. When the hardware modules are activated, the hardware modules perform the methods and processes included within the hardware modules. In some embodiments, the hardware modules include one or more general-purpose circuits (e.g. general-purpose circuits in processing subsystem 102) that can be configured by executing instructions to perform the methods and processes.

Computer System

Figure 1:
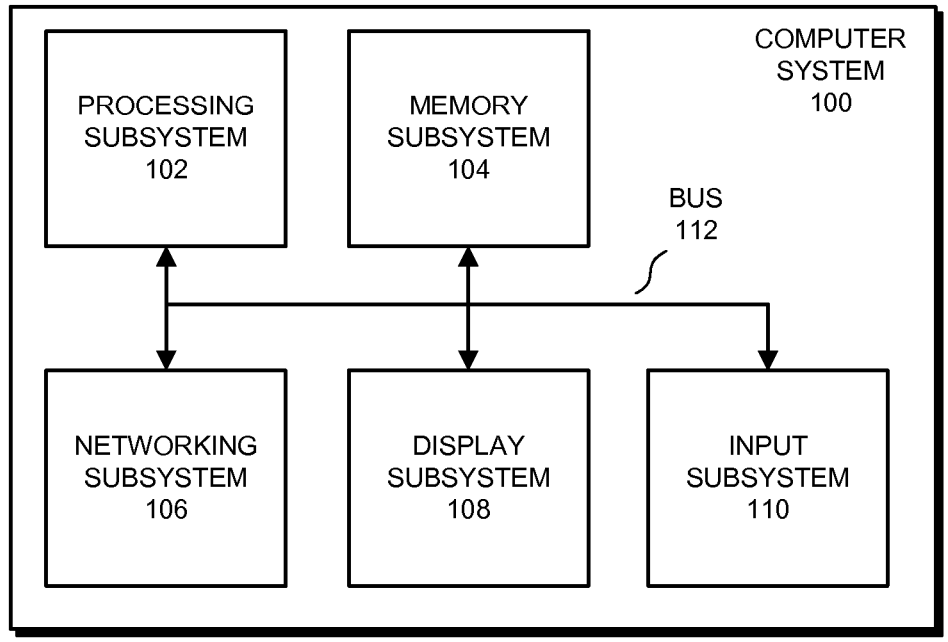
FIG. 1 presents a block diagram illustrating a computer system in accordance with the described embodiments.

FIG. 1 presents a block diagram illustrating a computer system 100 in accordance with the described embodiments. Computer system 100 includes processing subsystem 102, memory subsystem 104, networking subsystem 106, display subsystem 108, and input subsystem 110.

Processing subsystem 102 can include one or more devices configured to perform computational operations. For example, processing subsystem 102 can include, but is not limited to, one or more microprocessors, ASICs, microcontrollers, or programmable-logic devices.

Memory subsystem 104 can include one or more devices and/or computer readable storage mediums for storing data and/or instructions for processing subsystem 102 and networking subsystem 106. For example, memory subsystem 104 can include DRAM, flash memory, and/or other types of memory. In addition, memory subsystem 104 can include mechanisms for controlling access to the memory. In some embodiments, memory subsystem 104 includes a memory hierarchy that includes an arrangement of one or more caches coupled to a memory for computer system 100. In some of these embodiments, one or more of the caches is located in processing subsystem 102.

In some embodiments, memory subsystem 104 is coupled to one or more high-capacity mass-storage devices (not shown). For example, memory subsystem 104 can be coupled to a magnetic or optical drive, a solid-state drive, or another type of mass-storage device. In these embodiments, memory subsystem 104 can be used by computer system 100 as fast-access storage for often-used data, while the mass-storage device is used to store less frequently accessed data.

Networking subsystem 106 can include one or more devices configured to communicate on a corresponding wired and/or wireless network. Networking subsystem 106 can include controllers, radios/antennas for wireless network connections, sockets/plugs for hard-wired electrical connections, and/or other devices used for coupling to, communicating on, and handling data and events on a wired and/or wireless network.

Display subsystem 108 can include one or more devices configured for displaying output from computer system 100 on a display device (not shown). For example, display subsystem 108 can display output from computer system 100 on a monitor, a screen, a touch screen, and/or another display device.

Input subsystem 110 can include one or more devices configured to receive commands, text, and data input by a user or another device, and forward the received input to the other subsystems in computer system 100. For example, input subsystem 110 can receive input from a keyboard, a mouse, a stylus, a touch screen in the display, and/or another input device.

Within computer system 100, the subsystems (i.e., processing subsystem 102, memory subsystem 104, networking subsystem 106, display subsystem 108, and input subsystem 110) are coupled together using bus 112. Bus 112 is an electrical connection that the subsystems can use to communicate commands and data between one another. Although only one bus 112 is shown for clarity, different embodiments can include a different number or configuration of electrical connections between the subsystems.

Although shown as separate subsystems in FIG. 1, in some embodiments, some or all of a given subsystem can be integrated into one or more of the other subsystems in computer system 100. For example, as described above, one or more caches in memory subsystem 104 can be included in processing subsystem 102 and/or another of the subsystems. Although alternative embodiments can be configured in this way, for clarity we describe the subsystems separately.

Computer system 100 can be incorporated into many different types of electronic devices. Generally, these electronic devices include any device that executes a word processor that can automatically configure the white space around an object in a document. For example, computer system 100 can be part of a desktop computer, a laptop computer, a server, a media player, an appliance, a subnotebook/netbook, a cellular phone, a network appliance, a tablet computer, a set-top box, a personal digital assistant (PDA), a smart phone, a toy, a controller, or another device.

Although we use specific components to describe computer system 100, in alternative embodiments, different components and/or subsystems may be present in computer system 100. For example, computer system 100 may include one or more additional processing subsystems 102, memory subsystems 104, and/or networking subsystems 106. Alternatively, one or more of the subsystems may not be present in computer system 100.

In some embodiments, computer system 100 may include one or more additional subsystems that are not shown in FIG. 1. For example, computer system 100 can include, but is not limited to, a data collection subsystem, an audio subsystem, an alarm subsystem, a media processing subsystem, and/or an input/output (I/O) subsystem.

Figure 2:
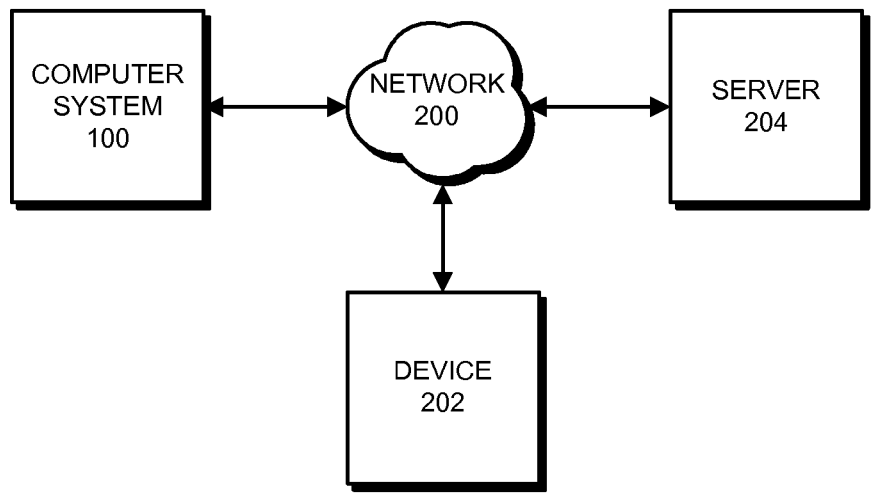
FIG. 2 presents a block diagram illustrating a network in accordance with the described embodiments.

FIG. 2 presents a block diagram illustrating a network 200 in accordance with the described embodiments. As shown in FIG. 2, network 200 is coupled to computer system 100, device 202, and server 204. Generally, network 200 can include any wired or wireless connections and/or devices used for electronically transferring data between computer system 100, device 202, and/or server 204. For example, network 200 can be, but is not limited to, the Internet, a wired or wireless local-area network (LAN), or a wide area network (WAN). Networks are generally known in the art and hence are not described in detail.

Device 202 can be any device that can use a locally or remotely executed word processor that automatically configures white space around objects in documents. For example, device 202 can be a desktop computer, a laptop computer, a server, a media player, an appliance, a subnotebook/netbook, a cellular phone, a network appliance, a tablet computer, a terminal, a set-top box, a PDA, a smart phone, a toy, a controller, or another device.

Server 204 can include any system that includes one or more mechanisms for servicing requests from a "client" system such as computer system 100 or device 202 for computational and/or data-storage resources. In some embodiments, server 204 is a server which hosts applications that can be accessed remotely and used by other systems (e.g., computer system 100 or device 202) coupled to network 200. For example, in some embodiments, server 204 is a web server that provides applications that can be accessed by the other systems using a web browser or another client application on those systems. In some of these embodiments, server 204 can host a word processor that can be accessed using a web browser or another client application in the other systems.

Although we present network 200 in FIG. 2 as an exemplary embodiment of a network 200, alternative embodiments use different types or configurations of networks, or multiple separate networks. In addition, alternative embodiments may include more or fewer devices coupled to network 200, or different types of devices coupled to network 200. Generally, in the described embodiments, one or more devices that can locally or remotely execute a word processor that automatically configures white space around objects in documents are coupled to a network for communicating between one another.

Word Processor

The described embodiments provide a word processor 300 (see FIG. 3) that automatically configures white space for objects in a document. Generally, word processor 300 is an application that enables users to create, edit, and perform operations on documents and other files (for clarity and simplicity, we refer to all the types of files that can be created, edited, or operated on by word processor 300 collectively as "documents"). The documents can include both text and non-textual objects. For example, word processor 300 can be, but is not limited to, a word processor such as Pages from Apple Inc., of Cupertino, Calif.; Word from Microsoft Inc., of Redmond, Wash.; or another word processor.

Figure 3:
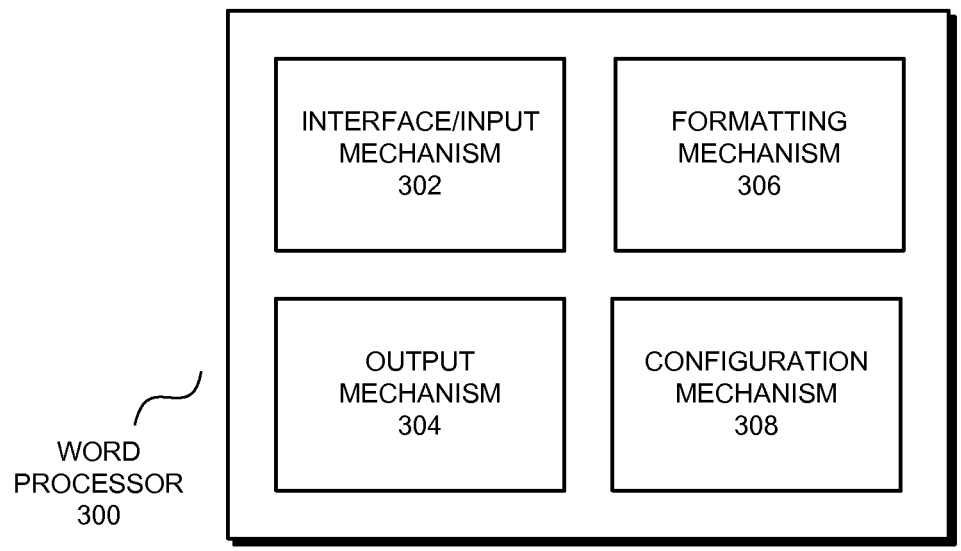
FIG. 3 presents a block diagram illustrating a word processor in accordance with the described embodiments.

Word processor 300 includes numerous mechanisms to enable a user to create; input, configure, and remove text; input, configure, and remove non-textual objects; modify; convert; translate; format; output (e.g., print or display); and otherwise interact with documents. FIG. 3 presents a block diagram illustrating a word processor 300 in accordance with the described embodiments. As shown in FIG. 3, word processor 300 includes interface/input mechanism 302, output mechanism 304, formatting mechanism 306, and configuration mechanism 308.

Interface/input mechanism 302 is an exemplary mechanism that provides the user interface (i.e., the graphical user interface) and receives user input for word processor 300. Output mechanism 304 is an exemplary mechanism that provides file output, display, printing, and other output for word processor 300. Formatting mechanism 306 is an exemplary mechanism that provides formatting for documents and other types of files being created or modified using word processor 300. Configuration mechanism 308 is an exemplary mechanism that provides user-configurable settings for customizing the operation of word processor 300.

Although we present the simplified mechanisms in word processor 300 as examples, alternative embodiments can include more, fewer, and/or different mechanisms. In addition, although we present these mechanisms as separate mechanisms in word processor 300, in some embodiments some or all of the mechanisms (or the functions of the mechanisms) can be combined. Generally, the mechanisms not shown in FIG. 3, but that are typically present in word processors are known in the art and hence are not described in detail.

In some embodiments, word processor 300 is executed locally by processing subsystem 102 in computer system 100. In these embodiments, the files and data for word processor 300 can be stored in memory subsystem 104 or can be retrieved from another device over a network using networking subsystem 106. In addition, display subsystem 108 can display the document or file being created or modified using word processor 300, and input subsystem 110 can accept user inputs and commands to create or modify the document or file.

In alternative embodiments, a host computer system such as server 204 executes word processor 300 for a client device. For example, the client device in these embodiments can be computer system 100, device 202, or another device. In these embodiments, server 204 can transfer data for displaying the word processor 300's user interface across network 200 to the client. A user of the client device can then perform operations using word processor 300's interface on the client device and the client device can forward the user's input to server 204. In these embodiments, server 204 can perform most of the computational operations for executing word processor 300 (with the exception of displaying the interface to the user and receiving/forwarding user input) and storing information and data for word processor 300. In these embodiments, assuming that computer system 100 is the client, display subsystem 108 can display the document or file being created or modified using word processor 300 from data received from server 204, and input subsystem 110 can accept user inputs and commands to create or modify the document or file and forward the input and commands to server 204 using networking subsystem 106.

In some embodiments, server 204 provides the interface for word processor 300 to the client device using a web interface. Thus, in the client device, the user interface for word processor 300 can be accessed using a web browser or another client application.

Note that although we describe word processor 300 as a "word processor," the described embodiments are not limited to word processors. Generally, any application that can configure the white space around an object in a document can operate in the same way. For example, email programs, text editors, web browsers, and many other programs can perform the indicated operations. In addition, although we describe the embodiments using "documents," the documents in the described embodiments can include any type of file that can include text and objects (e.g., word processor documents, PDF files, bitmap images, architectural drawings, image files, web pages, etc.).

Configuring White Space Around Objects in a Document

In the described embodiments, word processor 300 can automatically configure the white space around objects in documents. More specifically, in the described embodiments, word processor 300 can provide a per-object or document-wide setting that enables a user to specify the amount of white space that appears around a given object. In these embodiments, when an object is placed in a section of text in a document, word processor 300 arranges the white space between the object and the text in accordance with the setting. Word processor 300 then determines if the white space on the sides of the object is likely to appear to a user to be even (i.e., is likely to have equal "visual weighting" or is approximately the same size). If word processor 300 determines that the white space is not likely to appear even, word processor 300 can adjust the white space on one or more of the sides to balance the white space or compensate for the difference in appearance.

In the described embodiments, an object can be any object that can be placed in a section of text within a document. For example, the object can be, but is not limited to, an image or picture; a table or chart; a graphic; a field; a symbol; a reference; a heading; a file; a title; a file or an object copied from a file; and/or a list. In addition, the object can be a composite object including two or more of these objects.

In the described embodiments, a section of text can be any amount of text within a document, from a single character to thousands of characters or words on multiple pages. The section of text can include an unformatted, simple block of plain text. Alternatively, the section of text can include text with formatting including: (1) section formatting, such as paragraphs, breaks, white space, indentations, and line spacing; (2) text formatting, such as bolding, italicization, font sizing, and/or spacing; and/or (3) other types of formatting, including internal word processor document format indicators and controls.

In the described embodiments, content within a document can include any combination of section(s) of text and/or object(s). As one example, content can include two sections of text with an image or table between them. As another example, content can include a single section of text or object.

In the described embodiments, word processor 300 includes one or more settings for configuring the arrangement of text around a given object. The setting can be used to control whether text is placed on a given side or sides of an object. For example, word processor 300 can be configured to place text above and below, but not on the sides of an object.

In some embodiments, word processor 300 includes a document-wide text-arrangement variable that configures word processor 300 to use a default text arrangement around objects in documents. Using the document-wide variable, word processor 300 can be configured to place text on the indicated sides of objects in documents. For example, word processor 300 can be configured to place text on all sides of each object by default (i.e., to wrap text all the way around the objects). Alternatively, word processor 300 can be configured to place text on one or more sides (e.g., only the top/bottom, etc.) of each object by default.

In addition to the document-wide (or default) text-arrangement variable, in some embodiments, word processor 300 can provide per-object text-arrangement variables that enable the configuration of the arrangement of text around an associated object. Moreover, word processor 300 can provide type-specific text-arrangement variables that enable the configuration of the arrangement of text around an associated type of objects (e.g., tables, images, given objects based on the underlying file type, etc.). These variables can be used to override the default text-arrangement setting for a given object or type of objects, respectively.

In the described embodiments, word processor 300 includes one or more document-wide white space configuration values that enable a user to control the amount of white space placed by word processor 300 between objects in the document and text in nearby sections of text. For example, in some embodiments, word processor 300 can include a single value that controls the white space on all sides of objects in the document. As another example, word processor 300 can include separate values that control the white space maintained for different sides, edges, or features of objects in the document (e.g., top, left side, right side, bottom, angles, slopes, curves, points, ragged edges, etc).

In some embodiments, word processor 300 includes one or more per-object white space configuration values that enable a user to control the amount of white space placed by word processor 300 between a corresponding object and text in nearby sections of text. More specifically, in these embodiments, word processor 300 is configured so that one or more individual objects include separate white space configuration values. For example, in some embodiments, an object can include a single value that controls the white space on all sides of the object. As another example, an object can include different values that control the white space maintained for different sides, edges, or features of the object.

Although we describe illustrate the embodiments using document-wide white space values and per-object white space values, alternative embodiments include additional and/or different white space values associated with, for example, groups of objects, objects in a given portion or portions of a document, objects of a given type (e.g., images, tables, etc.), etc. The alternative embodiments function in the same way as the described embodiments.

In the described embodiments, the white space placed by word processor 300 around an object can be adjusted by changing corresponding per-object white space values. For example, assuming that a user wishes to increase the white space around the object, a white space value can be increased for the object. Word processor 300 then increases the amount of white space on the indicated sides of the object.

In the described embodiments, word processor 300 supports a number of fonts that can be used to configure the appearance of sections of text in documents. Generally, these fonts can include extra space above, below, or beside each character for marks that contribute to the meaning of the character in the font or enable formatting text. In some embodiments, the marks include formatting marks, accent marks, diacritical marks, glyphs and/or other marks (e.g., a cedilla, an acute accent, a caret, etc.). In addition, fonts can include spaces for typographical features (e.g., underscores, overscores/overlines, subscripts/superscripts, etc.). Moreover, fonts can include spaces for ascenders and descenders. For clarity, in the remaining description, we may refer to the marks or font features for which extra space is reserved within characters in a font collectively as "marks."

Figure 4:
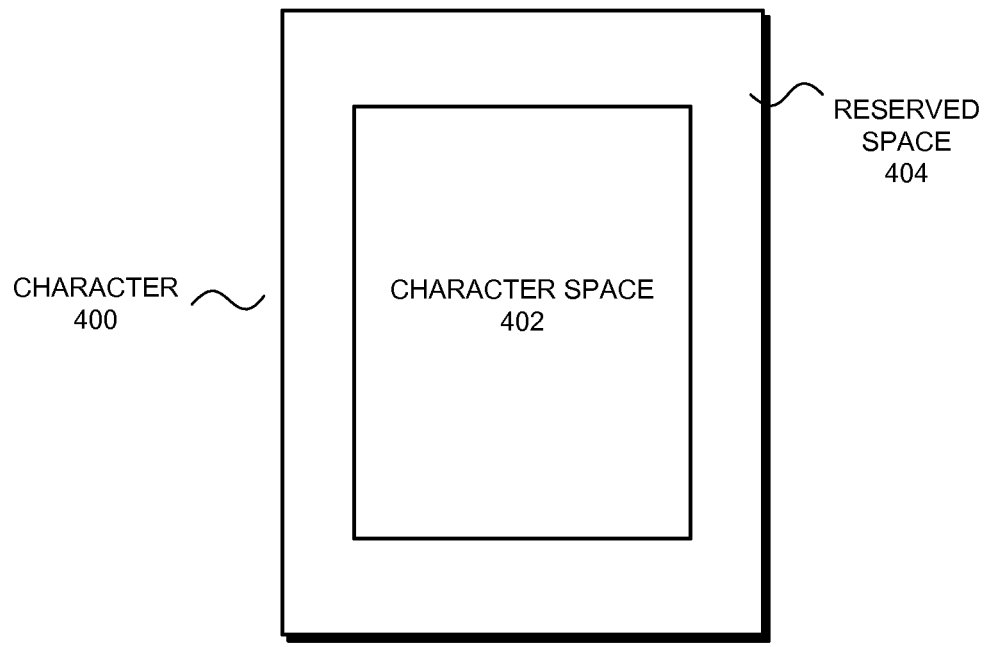
FIG. 4 presents a block diagram illustrating a character in accordance with the described embodiments.

FIG. 4 presents a block diagram illustrating a character 400 in accordance with the described embodiments. As shown in FIG. 4, character 400 includes character space 402 and reserved space 404. As described above, the character is placed in character space 402, while reserved space 404 is used by word processor 300 for adding marks that format or otherwise contribute to the meaning of character 400.

Although we present an exemplary character 400, alternative fonts use differently-arranged character spaces 402 and reserved spaces 404. In addition, although lines are drawn to provide examples of the boundary of character 400, character space 402, and reserved space 404, in alternative embodiments, the distinction between the spaces (and of the font itself) may not be as rigid or distinct.

Although reserved space can be included for marks in fonts, the space may be unused. For example, although fonts in the described embodiments can include space reserved for accent marks, a given section of text may not include accent marks, or may include accent marks with only a small subset of many characters in a section of text. As described below, in cases where the reserved space in fonts is unused, the described embodiments may use the space to configure or adjust the white space around nearby objects.

As described above, when placing an object in a section of text, word processor 300 initially arranges the white space around the object in accordance with a white space value for the object (e.g., a default white space value or a per-object white space value). In the described embodiments, word processor 300 then determines if the white space around the object is likely to appear to a user to be unbalanced (or "visually unweighted"). Generally, this means that word processor 300 compares the white space on each of the sides with one or more of the other sides to determine if the white space on the side is likely to appear equal or is numerically (dimensionally) equal to the other sides. If the white space appears unequal, word processor 300 can then adjust the white space to make the white space appear more balanced.

In some embodiments, the definition of what dimensions of white space are likely to appear unbalanced to a user can be configured using a variable or a threshold in word processor 300. For example, a certain distance in points, inches, or otherwise can be set in an unbalanced threshold variable in word processor 300. In some embodiments, word processor 300 can include a module that can prompt a user to provide a response regarding the balanced or unbalanced appearance of a given amount of white space and can use the response in the determination.

In some embodiments, when comparing the white space, word processor 300 determines if nearby text was displaced by the white space and, if so, by how much. More specifically, word processor 300 determines if a line or character of text was prevented from being placed in proximity to a corresponding side of an object because the white space configured to be placed on that side of the object prevented the text from being placed there. If the text is displaced by less than a threshold amount, word processor 300 can adjust the white space setting for the corresponding side of the object to a smaller value to enable the text to be placed nearer to the object. This operation can balance the appearance (or visual weighting) of the white space around the object.

For example, assume that the white space around an object is set to 18 points and that text in a section of text near the object uses a 12 point font that includes 2 points of reserved space. Word processor 300 can determine that a line of text that could have been placed below the object was instead displaced by 1 point due to the white space around the object. Consequently, the line of text has been placed an extra line space below the object, leaving almost an entire line space open below the object. Word processor 300 can further determine that the reserved spaces in the line of text are unused. Because the 2-point reserved space is unused and the displacement is only 1 point, word processor 300 can adjust the white space value for the bottom edge of the object to 17 points, and can then place the line of text in the otherwise unusable line space under the object. Note that because the reserved space is unused, the white space under the object (i.e., the smaller amount of white space between the object and the repositioned line of text) appears to a user to be more balanced in comparison with the white space above the object.

In some embodiments, the threshold amount is the reserved space in the characters in the font on the corresponding side of the object. More specifically, in these embodiments, word processor 300 adjusts the white space by up to an amount of unused reserved space around the characters in the font. In alternative embodiments, another value is used. For example, the threshold can be a percentage of the font size, a percentage of the white space value, a default white space adjustment value for the document or for the object, or another value.

In some embodiments, the adjustment to the white space is a value that is maintained in the object. In these embodiments, the white space value is maintained for the object, and an offset or adjustment value is also maintained for the object. When no adjustment is used, the adjustment value is set to zero. Otherwise, the adjustment value can be set to an amount proportional to the white space adjustment on the corresponding side(s) of the object (e.g., 12 points of white space with a +/−2 point adjustment value).

In some embodiments, when placing an object, word processor 300 sets the value for the white space on a given side (e.g., the left side or the top side) to the corresponding white space value, and adjusts the value on the other side to balance the visual weighting of the white space between the opposing sides. In other words, in some embodiments, the adjustment is made only on one side of a pair of opposing sides, and is made to balance the adjusted side with respect to the set side. For example, in some embodiments, word processor 300 sets the white space value for the top side of an object and adjusts the white space value for the bottom side of the object (i.e., if an adjustment could improve the appearance of balance of the white space for the object).

Note that, although this example describes comparing the white space on one side of an object with respect to the opposite side of the object, some embodiments can compare any of one or more sides of an object with any of one or more other sides of the object to determine if the visual weighting of the white space for an object is unbalanced between the compared side(s). In some embodiments, this can mean some or all of the perimeter (i.e., outside edge) of an object is compared to a portion of the perimeter of the object or to an object derived from the white space around the object. For example, the white space around a given portion of a circle, a star, or another many-sided or curved object can be compared with the average white space, or with a white space at a predetermined point or points on the perimeter of the object. In some embodiments, the adjustment can be made to a given side (or portion of the perimeter) based on any of the above-described comparisons.

In some embodiments, word processor 300 adjusts the white space for an object only at predetermined times. For example, assuming the embodiments described above where the white space is set for the top side of an object and adjusted for the bottom side of the object, if a user is entering a line of text across the bottom of the object, word processor 300 may not make the adjustment as every character is entered across the bottom of the object. Instead, word processor 300 may wait until the line of text is full (i.e., until a next line has been started) and then perform the white space balance adjustment. These embodiments can avoid the case where characters that are being entered (e.g., characters with accent marks) cause the white space balance to change, which, if word processor 300 was adjusting the white space balance with each character, could cause the line of text to appear to "jump around" as the text was entered.

In some embodiments, a user can configure word processor 300 to compute a value for the available white space on opposing sides of an object and adjust the white space on the opposing sides to be a predetermined portion (e.g., half) of the available white space. In this way, word processor 300 can "center" an object from side to side or from top to bottom in an available white space region. For example, assume an object that is set to 12 points of white space on each side of an object and that the white space configuration has caused a line of text to be displaced below the object, leaving 14 points of extra space below the object. If the user has configured word processor 300 to center the object in the available white space, word processor 300 can determine that there are 38 points of available white space, and can adjust the white space on the top and bottom of the object to 19 points apiece. Note that, in some embodiments, such adjustments are prevented from being made when the adjustment to a given white space value is more than a predetermined amount. Using the threshold can help word processor 300 avoid placing too large of an adjusted white space on a given side of an object.

In some embodiments, the white space adjustment value is related to the size of the font. For larger font sizes, an adjustment value can be larger. This can include the proportionally larger reserved space in such font sizes and/or can be a discrete value associated with each font size.

Process for Configuring White Space Around Objects in a Document

Figure 5:
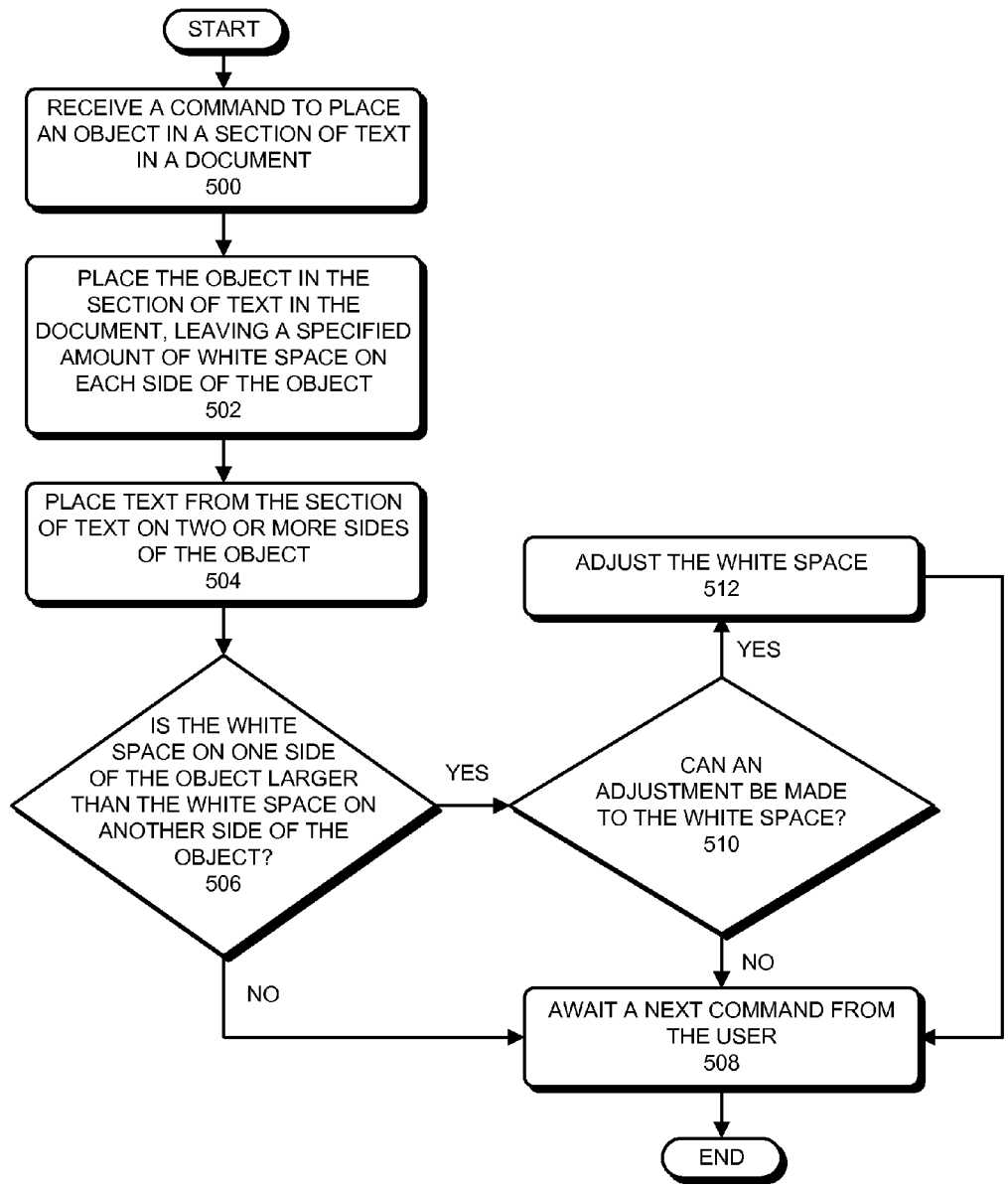
FIG. 5 presents a flowchart illustrating a process for configuring white space around objects in a document in accordance with the described embodiments.

FIG. 5 presents a flowchart illustrating a process for configuring white space around objects in a document in accordance with the described embodiments.

The process in FIG. 5 starts when word processor 300 receives a command from a user to place an object in a section of text in a document (step 500). For example, the user can instruct word processor 300 to place an image at a given location in a specified section of text.

Word processor 300 then places the object in the section of text in the document, leaving a specified amount of white space on each side of the object (step 502). The specified amount of white space can be determined from default values (document-wide values), from per-object values, or from other values that dictate the amount of white space to be placed around the object. For example, if the object includes per-object values of 12 points for the top and bottom, and 10 points for the sides, word processor 300 can place these amounts of white space on the corresponding sides.

Next, word processor 300 places text from the section of text on two or more sides of the object (step 504). For example, word processor 300 can place text on the sides of the object in accordance with a document-wide text-arrangement variable, or can place text on the sides of the object in accordance with a per-object text-arrangement variable.

Word processor 300 then determines if the white space on one side of the object is larger than the white space on another (corresponding) side of the object (step 506). For example, word processor 300 can determine if the white space on the bottom of the object is larger than the amount of white space on the top of the object. When making this determination, these embodiments can measure a distance between an edge of the object and the start of the visible part of text located in proximity to the edge of the object. For example, assuming that the white space balance is being determined between the top and bottom of an object, word processor 300 can determine if the distance from the top of the object to the bottom-most portion of text above the object is equivalent to the distance from the bottom of the object to the topmost portion of text below the object.

Note that this measurement can be to the visible portion of the text, and not to the topmost or bottommost point of the characters in the text. Thus, if the reserved space in the text in proximity to an edge is not used, word processor 300's measurement reaches to the main portion of the character.

If the white space is balanced (i.e., the white space on one side is not larger than the corresponding other side), the process of configuring white space is finished and word processor 300 awaits a next command from the user (step 508).

Otherwise, if the white space on one side is larger, word processor 300 determines if an adjustment can be made to the white space on the sides of the object (step 510). For example, assume that the space between the top of an object and the bottommost visible portion of the nearby text is set to (and configured to be) 12 points, and that the space between the bottom of the object and the topmost visible portion of the text below the bottom of the object is 28 points, which includes 12 points for the configured white space and 16 points for the font and the reserved space in the font (i.e., that the font has been placed a line away from the object because the font is slightly too large to fit in the first line below the object without causing the white space to be less than the configured 12 points). In this case, word processor 300 determines if the font is using the reserved space. If so, word processor 300 can determine that the adjustment cannot be made (step 510). In this case, the process of configuring the white space is finished and word processor 300 awaits a next command from the user (step 508).

Otherwise, if an adjustment can be made, word processor 300 adjusts the white space (step 512). When adjusting the white space, word processor 300 can adjust the white space values for the object to balance the white space on one or more sides of the object. In the some embodiments, word processor 300 does this by setting an offset value that is deducted from a per-object white space value for a corresponding side. For example, if the white space on the bottom of an object is to be adjusted, word processor 300 can set the offset value to the adjustment amount, and can then add or subtract the offset value from the white space value for the bottom side of the object. After this operation is completed, the process of configuring the white space is finished and word processor 300 then awaits a next command from the user (step 508).

In some embodiments, one or more of the steps in the process in FIG. 5 are performed in a different order and/or are combined with other steps. For example, in some embodiments, the object is not actually placed in the section of text until the white space has been configured. In these embodiments, word processor 300 can model the placement of the object in the section of text and use the model to determine the configuration of white space around the object. After determining the configuration, word processor 300 can place the object in the document with the determined amount of white space around the object.

As described above, in some embodiments, the white space on each side of the object may be configured to be a particular amount. For example, the white space on one side of the object may be 10 points and the white space on another side of the object may be 14 points. In these embodiments, when word processor 300 determines the balance of the white space, word processor 300 can account for the differences in white space. In addition, word processor 300 can maintain these differences when making any adjustments to the white space. In these embodiments, word processor 300 is not limited to simply equalizing the white space on the sides of the object.

Figure 6A:
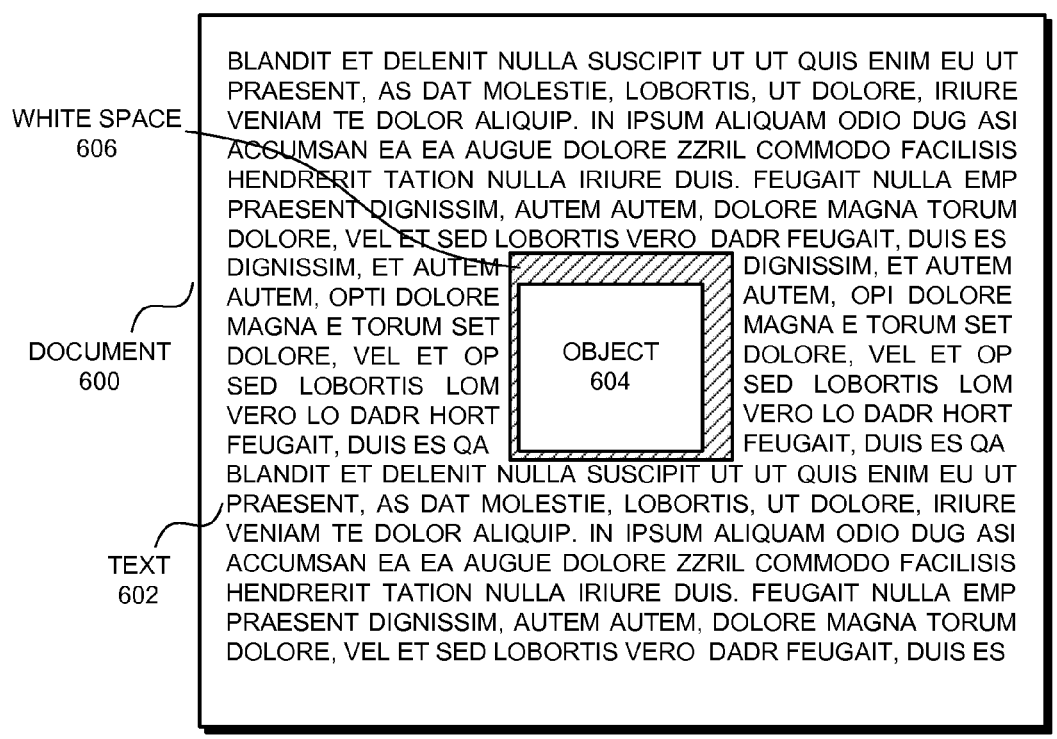
FIGS. 6A-6C present block diagrams illustrating the configuration of white space around an object in accordance with the described embodiments.
Figure 6B:
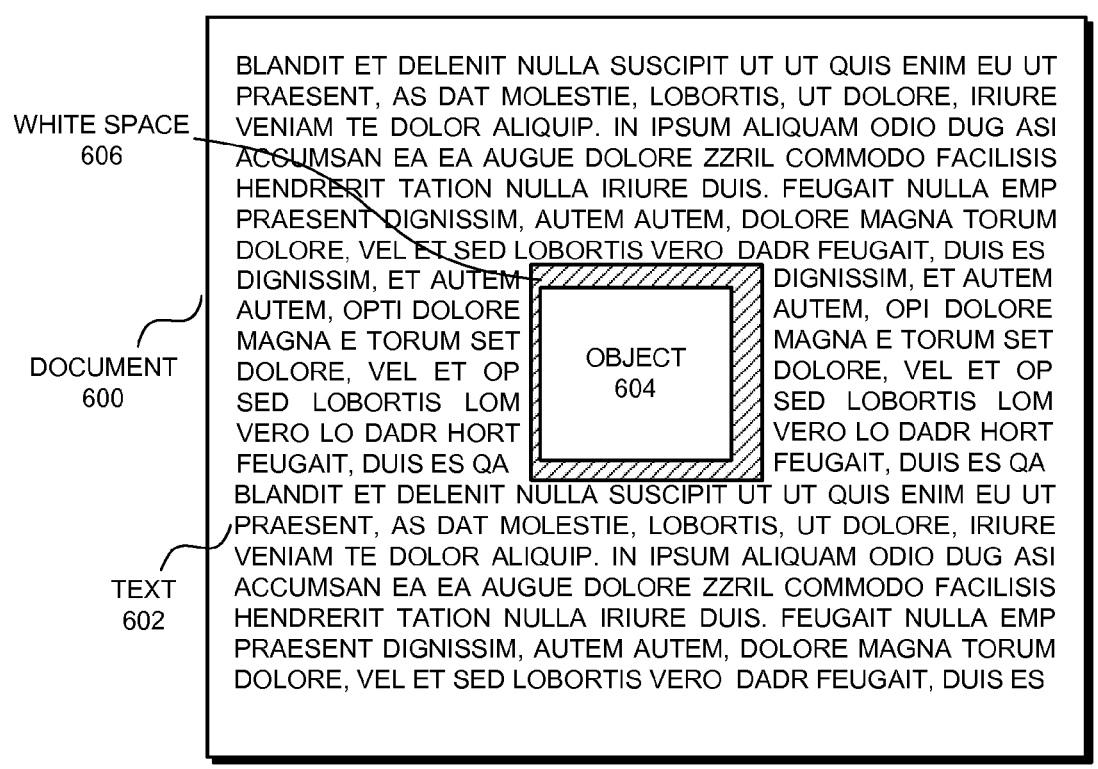
Figure 6C:
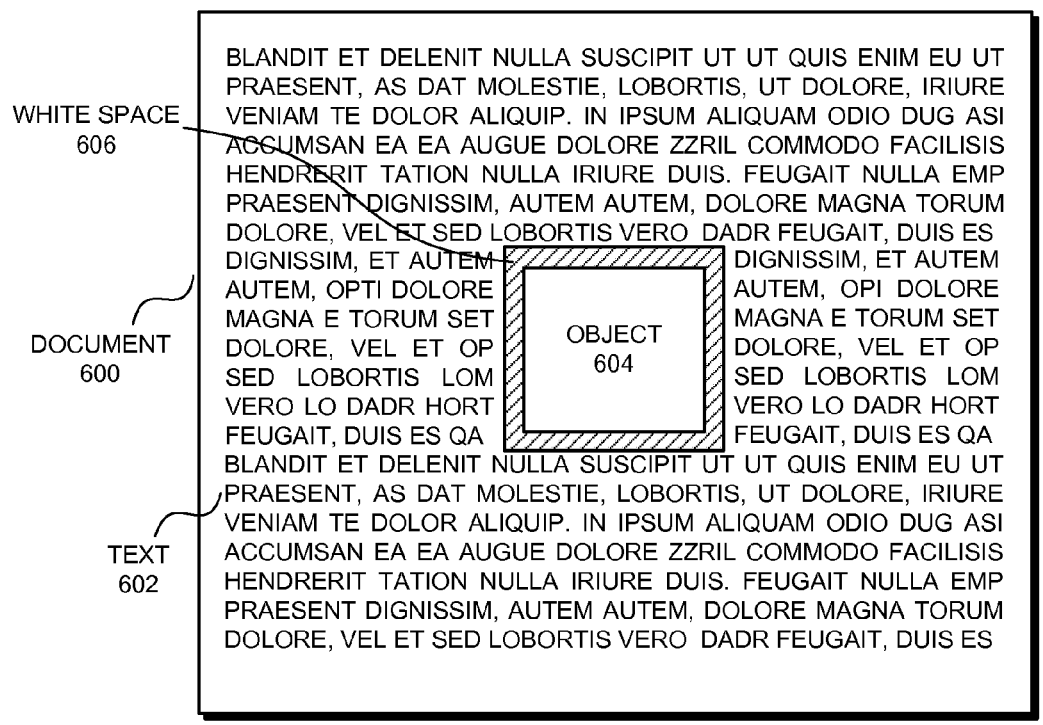

FIGS. 6A-6C present block diagrams illustrating the configuration of white space 606 around object 604 in document 600 in accordance with the described embodiments. More specifically, FIG. 6A shows an initial state for a document 600, FIG. 6B shows an exemplary intermediate configuration state for white space 606, and FIG. 6C shows a final configuration state for white space 606.

Note that although we present these example figures to describe the embodiments, some embodiments perform different operations or perform the similar operations in different ways, but achieve the same result. Generally, the described embodiments configure some or all of white space 606 around object 604 to balance white space 606 around object 604.

As shown in FIG. 6A, white space 606 around object 604 in section of text 602 is initially visually weighted up and to the right. In other words, white space 606 is larger on the top and right sides of the object 604.

In a first configuration step, word processor 300 adjusts white space 606 on the top side of object 604. More specifically, word processor 300 compares white space 606 on the top and bottom sides of object 604 and determines that white space 606 is unbalanced (i.e., is larger on the top). As described above, one possible technique for making this determination can be comparing the distance from the top edge of object 604 to the bottommost visible portion of text 602 above object 604 to the distance from the bottom edge of object 604 to the topmost visible portion of the text 602 below object 604. Upon determining that white space 606 is unbalanced, word processor 300 adjusts white space 606 on the top side of object 604 to balance white space 606. FIG. 6B shows the appearance of white space 606 following this operation.

In a second configuration step, word processor 300 adjusts white space 606 on the right side of object 604. As described above, word processor 300 first determines that white space 606 is larger on the right side of object 604, and then adjusts white space 606 on the right side of object 604. FIG. 6C shows the appearance of white space 606 following this operation. Note that following this operation, white space 606 is balanced (i.e., is evenly visually weighted) around object 604.

As indicated above, word processor 300 can perform different operations or different numbers of steps to configure the white space 606 around object 604. For example, in some embodiments, word processor 300 compares the opposing sides and determines the adjustment amounts in a first operation, and then adjusts the white space in a second operation.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for formatting a document in a word processor, comprising:
   placing an object in a section of text in the document;
   arranging a specified amount of white space on each side of a set of sides of the object;
   placing a first portion of text from the section of text on a first side of the object and a second portion of text from the section of text on a second side of the object; and
   after placing the first portion of text and the second portion of text:
      determining whether the first portion of text on the first side of the object is located further from the object than the second portion of text on the second side of the object, and
      when the first portion of text is located further from the object than the second portion of text:
         determining whether the first portion of text is displaced by less than a threshold amount due to the specified amount of white space arranged on the first side of the object,
         determining whether one or more reserved spaces associated with the first portion of the text are unused, and
         when the first portion of text is displaced by less than the threshold amount and the one or more reserved spaces associated with the first portion of the text are unused:
            determining that an adjustment to the specified amount of white space on the first side of the object can be made, and
            adjusting the specified amount of white space on the first side of the object so that the first portion of text is located closer to the object, wherein adjusting the specified amount of white space comprises adjusting a per-object white space value associated with the first side of the object based on an offset value associated with the object.

2. The method of claim 1, wherein the specified amount of white space on each side of the set of sides of the object includes:
   a default amount of white space on each side of the object; or
   a configured amount of white space on each side of the object, wherein the configured amount is set using one or more per-object white space values associated with the set of sides of the object.

3. The method of claim 1, wherein placing the first portion of text on the first side and the second portion of text on the second side of the object includes:
   placing the first portion of text and the second portion of text in accordance with at least one of a document-wide text-arrangement variable or a per-object text-arrangement variable.

4. The method of claim 1, wherein determining whether the first portion of text is located further from the object than the second portion of text comprises:
   determining a first distance from the first side of the object to a nearest visible portion of the first portion of text on the first side of the object; and
   determining a second distance from the second side of the object to a nearest visible portion of the second portion of text on the second side of the object.

5. The method of claim 4, wherein the method further comprises:
   determining that the first portion of text on the first side of the object is located further from the object than the second portion of text on the second side of the object when the first distance is greater than the second distance by more than a threshold value.

6. The method of claim 5, wherein adjusting the specified amount of white space on the first side of the object includes:
   reducing the specified amount of white space on the first side of the object to yield a reduced specified amount of whitespace; and
   repositioning the first portion of text from the section of text on the first side of the object closer to the first side of the object in accordance with the reduced specified amount of white space.

7. The method of claim 6, wherein reducing the specified amount of white space on the first side of the object includes:
   subtracting the offset value from the per-object white space value associated with the first side of the object.

8. The method of claim 1, further comprising:
   comparing the specified amount of white space around a portion of a perimeter of the object with an amount of white space at one or more predetermined points on the perimeter of the object; and
   adjusting the specified amount of white space around the portion of the perimeter of the object based on the comparing.

9. The method of claim 1, wherein adjusting the specified amount of white space on the first side of the object so that the first portion of text is located closer to the object includes:
   moving the object further away from a nearest visible portion of the second portion of text on the second side of the object and closer to a nearest visible portion of the first portion of text on the first side of the object.

10. The method of claim 1, wherein performing the method includes executing the word processor in a processing subsystem.

11. A non-transitory computer-readable storage medium for storing instructions that when executed by a computer cause the computer to perform a method for formatting a document in a word processor, comprising:
   placing an object in a section of text in the document;
   arranging a specified amount of white space on each side of a set of sides of the object;
   placing a first portion of text from the section of text on a first side of the object and a second portion of text from the section of text on a second side of the object; and
   after placing the first portion of text and the second portion of text:
      determining whether the first portion of text on the first side of the object is located further from the object than the second portion of text on the second side of the object, and
      when the first portion of text is located further from the object than the second portion of text:
         determining whether the first portion of text is displaced by less than a threshold amount due to the specified amount of white space arranged on the first side of the object,
         determining whether one or more reserved spaces associated with the first portion of the text are unused, and
         when the first portion of text is displaced by less than the threshold amount and the one or more reserved spaces associated with the first portion of the text are unused:
            determining that an adjustment to the specified amount of white space on the first side of the object can be made, and
            adjusting the specified amount of white space on the first side of the object so that the first portion of text is located closer to the object, wherein adjusting the specified amount of white space comprises adjusting a per-object white space value associated with the first side of the object based on an offset value associated with the object.

12. The non-transitory computer-readable storage medium of claim 11, wherein the specified amount of white space on each side in the set of sides of the object includes:
   a default amount of white space on each side of the object; or
   a configured amount of white space on each side of the object, wherein the configured amount is set using one or more per-object white space values associated with the set of sides of the object.

13. The non-transitory computer-readable storage medium of claim 11, wherein placing the first portion of text on at least the first side and the second portion of text on the second side of the object includes:
   placing the first portion of text and the second portion of text in accordance with at least one of a document-wide text-arrangement variable or a per-object text-arrangement variable.

14. The non-transitory computer-readable storage medium of claim 11, wherein determining whether the first portion of text is located further from the object than the second portion of text comprises:
   determining a first distance from the first side of the object to a nearest visible portion of the first portion of text on the first side of the object; and
   determining a second distance from the second side of the object to a nearest visible portion of the second portion of text on the second side of the object.

15. The non-transitory computer-readable storage medium of claim 14, wherein the method further comprises:
   determining that the first portion of text on the first side of the object is located further from the object than the second portion of text on the second side of the object when the first distance is greater than the second distance by more than a threshold value.

16. The non-transitory computer-readable storage medium of claim 15, wherein adjusting the specified amount of white space on the first side of the object includes:
   reducing the specified amount of white space on the first side of the object to yield a reduced specified amount of white space; and
   repositioning the first portion of text from the section of text on the first side of the object closer to the first side of the object in accordance with the reduced specified amount of white space.

17. The non-transitory computer-readable storage medium of claim 16, wherein reducing the specified amount of white space on the first side of the object includes:
subtracting the offset value from the per-object white space value associated with the first side of the object.

18. The non-transitory computer-readable storage medium of claim 11, wherein the method further comprises:
comparing the specified amount of white space around a portion of a perimeter of the object with an amount of white space at one or more predetermined points on the perimeter of the object; and
adjusting the specified amount of white space around the portion of the perimeter of the object based on the comparing.

19. The non-transitory computer-readable storage medium of claim 11, wherein adjusting the specified amount of white space on the first side of the object so that the first portion of text is located closer to the object includes:
moving the object further away from a nearest visible portion of the second portion of text on the second side of the object and closer to a nearest visible portion of the first portion of text on the first side of the object.

20. An apparatus for formatting a document in a word processor, comprising:
a processing subsystem including a microprocessor, wherein the processing subsystem is configured to:
place an object in a section of text in the document;
arrange a specified amount of white space on each side of a set of sides of the object;
place a first portion of text from the section of text on a first side of the object and a second portion of text from the section of text on a second side of the object;
measure a first distance between the first side of the object and the first portion of text;
measure a second distance between the second side of the object and the second portion of text;
determine whether the first portion of text on the first side of the object is located further from the object than the second portion of text on the second side of the object based on the first distance and the second distance; and
when the first portion of text is located further from the object than the second portion of text:
determine whether the first portion of text is displaced by less than a threshold amount due to the specified amount of white space arranged on the first side of the object,
determine whether one or more reserved spaces associated with the first portion of the text are unused, and
when the first portion of text is displaced by less than the threshold amount and the one or more reserved spaces associated with the first portion of the text are unused:
determine that an adjustment to the specified amount of white space on the first side of the object can be made, and
adjust the specified amount of white space on the first side of the object so that the first portion of text is located closer to the object, wherein the specified amount of white space is adjusted by adjusting a per-object white space value associated with the first side of the object based on an offset value associated with the object.

21. A method for formatting a document in a word processor, comprising:
placing an object in a section of text in the document;
arranging a specified amount of white space on each side of a set of sides of the object;
placing a first portion of text from the section of text on a first side of the object and a second portion of text from the section of text on a second side of the object; and
after placing the first portion of text and the second portion of text:
measuring a first distance between the first side of the object and the first portion of text,
measuring a second distance between the second side of the object and the second portion of text,
determining whether the first portion of text on the first side of the object is a first desired distance from the object,
when the first distance is different from the first desired distance:
determining that a first adjustment to the specified amount of white space on the first side of the object can be made when one or more reserved spaces associated with the first portion of text are unused, and
adjusting the specified amount of white space on the first side of the object so that the first portion of text is located at the first desired distance from the object,
determining whether the second portion of text on the second side of the object is a second desired distance from the object, and
when the second distance is different from the second desired distance:
determining that a second adjustment to the specified amount of white space on the second side of the object can be made when one or more reserved spaces associated with the second portion of text are unused, and
adjusting the specified amount of white space on the second side of the object so that the second portion of text is located at the second desired distance from the object.

* * * * *